United States Patent

[11] 3,609,059

| [72] | Inventor | Joseph A. Wagle<br>Indianapolis, Ind. |
|---|---|---|
| [21] | Appl. No. | 863,638 |
| [22] | Filed | Oct. 3, 1969 |
| [45] | Patented | Sept. 28, 1971 |
| [73] | Assignee | General Motors Corporation<br>Detroit, Mich. |

[54] ISOTHERMAL WHEEL
3 Claims, 2 Drawing Figs.

[52] U.S. Cl. .................................................. 416/95,
416/96
[51] Int. Cl. .................................................. F01d 5/08
[50] Field of Search .......................................... 416/90, 95,
96, 97; 415/114, 115

[56] References Cited
UNITED STATES PATENTS
| 2,401,826 | 6/1946 | Halford | 416/97 |
| 2,618,433 | 11/1952 | Loos et al. | 415/115 |
| 2,685,405 | 8/1954 | Stalker | 415/115 X |
| 2,910,268 | 10/1959 | Davies et al. | 415/144 UX |
| 2,947,512 | 8/1960 | Jones et al. | 415/114 |
| 3,085,400 | 4/1963 | Sonder et al. | 416/95 X |

*Primary Examiner*—Everette A. Powell, Jr.
*Attorneys*—Paul Fitzpatrick and Jean L. Carpenter ABSTRACT: A rotor wheel for a compressor operating at relatively high temperatures is made up of two disks enclosing a cavity between them and mounting blades at the rim of the wheel. A scoop tube projecting into the air path deflects air into the cavity within the wheel, within which it circulates and is exhausted near the rim of the wheel at the lower pressure face of the wheel. The circulating air reduces temperature gradients between the hot rim and the hub portion of the wheel.

PATENTED SEP 28 1971 3,609,059

INVENTOR.
Joseph R. Wagle
BY
Paul Fitzpatrick
ATTORNEY

ISOTHERMAL WHEEL

My invention is directed to turbomachinery such as compressors operating at relatively high temperatures and is particularly directed to reducing the stresses in the rotor wheels of such machines by minimizing temperature differences between the rim of the wheel, which is exposed to relatively hot gas, and the portion of the wheel near the axis of rotation.

In engines such as turbojets, the temperature of the air flowing through the compressor may reach high levels, about 1,00° F. In aircraft flying at high speed, the ram temperature rise causes a fairly high inlet temperature into the compressor and the air temperature increases successively through the stages of the compressor. While the temperatures in such compressors ordinarily are much lower than those in the turbines of gas turbine engines, it is not feasible to use extreme temperature alloys in the compressors. Good design precepts dictate that every component of a gas turbine engine should be made of material which is as inexpensive, convenient to fabricate, and low in critical contents as possible. However, in the later higher temperature stages of such compressors stresses arise due to the fact that the rim portion of the wheel, which is exposed to the hot rapidly flowing compressed air, is much hotter than portions adjacent the hub or axis of rotation of the compressor wheel. The result of this is that thermal expansion stresses are added to the already very high centrifugal stresses existing in such wheels because of their high rotational speed. Temperature cycling gives rise to fatigue and early failure of the wheels.

It has occurred to me that these stresses may be very substantially reduced by minimizing the temperature differential or temperature gradient between the rim and the hub portion of a wheel or disk of a compressor wheel exposed to high-temperature gas. In the preferred embodiment of my invention, this concept is implemented by providing a compressor wheel principally made up of two disks defining between them a cavity through which a heat exchange fluid may circulate and introducing a small portion of the air flowing through the compressor into this space, where it is circulated under the influence of centrifugal force and density variations and exhausted at the low-pressure face of the wheel near the rim. The hot air thus introduced into the wheel is lighter than air which has been cooled near the hub, and is displaced by the cooler air, which circulates toward the rim while the hotter air moves toward the hub. The resulting in- and out- circulation of the air within the wheel transfers heat from the hot compressed air to the inner parts of the wheel adjacent the hub portion, thus greatly reducing temperature gradients and resulting stresses in the wheel. In short, the entire wheel is brought more nearly to the same temperature.

The principal objects of my invention are to provide an improved compressor, particularly one exposed to hot motive fluid, to provide a compressor in which thermal stresses in the rotor disk are minimized, and to facilitate the use of less expensive and less critical materials in compressor rotors.

The nature of my invention and its objects will be clear to those skilled in the art from the succeeding detailed description of the preferred embodiment of the invention and the accompanying drawings.

Figure 1:
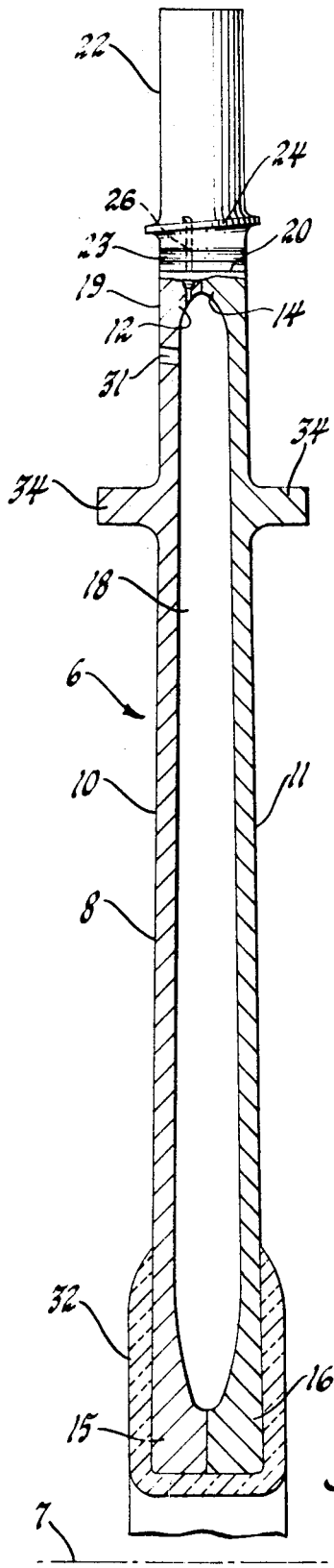
FIG. 1 is a sectional view, taken on a plane containing the axis of rotation, of a compressor wheel embodying my invention.
Figure 2:
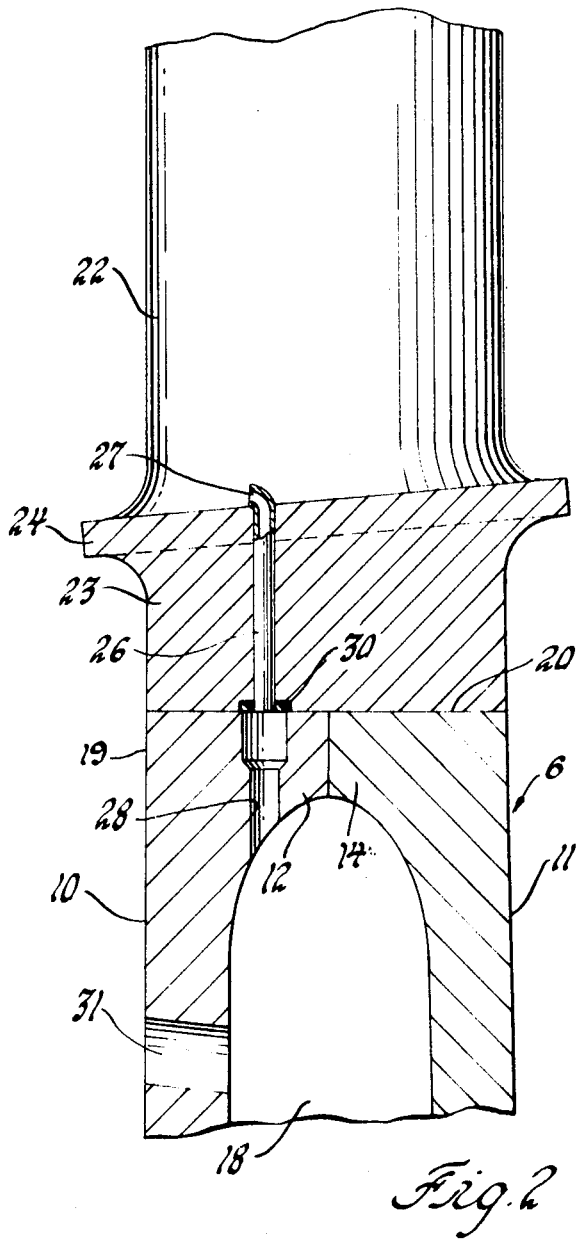
FIG. 2 is an enlarged view of a portion of FIG. 1.

Referring to the drawings, FIG. 1 is a half-section of a turbine rotor stage 6 rotatable about an axis 7. The stage comprises a hollow wheel 8 made up of generally parallel front and rear disks 10 and 11, respectively, these disks having thickened portions or flanges 12 and 14, abutting at the rim of the wheel, and 15 and 16, abutting at the hub of the wheel. Disks 10 and 11 may be welded, diffusion bonded, brazed, bolted, or otherwise fixed together to define a unitary wheel having within it an annular cavity 18 extending substantially through the entire radial extent of the wheel.

The rim 19 of the wheel defines a number of dovetail slots 20 within each of which is mounted a blade 22. Each blade has an airfoil portion and a dovetail root 23 which is engaged in the dovetail slot in the rim. Each blade also includes a platform 24, these platforms defining the inner boundary of the gas path through the compressor.

In the practice of my invention, means are provided to divert a small amount of the gas (hereinafter referred to as air) flowing through the compressor and direct it into the cavity 18. This preferably includes a number of small scoop tubes 26 in some or all of the blade roots 23, each having an inlet 27 facing into the gas stream adjacent the surface of the platform 24. Each scoop tube 26 may communicate with bores 28 extending through the wheel of the rim into the cavity 18 and may be sealed by an O-ring or equivalent at 30. As will be apparent, these scoop tubes have very little disturbing effect on the airflow, but serve to divert a significant amount of air, which may be boundary layer air, into the cavity 18, within which the hot air, which may be up to 1,000° F., circulates radially inwardly from the bores 28 toward the hub of the wheel 8 to replace air flowing outward adjacent disks 10 and 11. As the air circulates inwardly it is cooled somewhat by the outward flowing air and becomes more dense. As it flows past the inner part of disks 10 and 11 it is further cooled and becomes still more dense. Thus, by the action of centrifugal force due to the rapid rotation of the compressor disk, the cooled and denser airflows radially outward, making room for additional hot air to enter from the gas path through the compressor. The relatively cool air circulates radially outward adjacent the disks 10 and 11 until it reaches the rim and flows from cavity 18 through one of a number of circumferentially spaced heat transfer air outlets 31 in the forward or low pressure face of the wheel through the disk 10. From the forward face of the wheel, the cooling air may return to the air path through the compressor by the usual gap between the platforms 24 and the inner shroud (not illustrated) of the preceding stator stage.

Equalization of temperatures in the wheel may also be facilitated by providing insulation 32, as indicated, at the hub where the mass of metal is relatively heavy. The wheel may also include flanges 34 which are coupled to adjacent wheels in any suitable manner known to those skilled in the art.

It should be apparent from the foregoing that my invention provides for a high degree of equalization of temperature within the wheel and thus can result in substantial reduction of stresses in and mass of the wheel.

The detailed description of the preferred embodiment of the invention for the purpose of explaining the principles thereof is not to be considered as limiting or restricting the invention, as many modifications may be made by the exercise of skill in the art.

I claim:

1. A rotor stage for a turbomachine including a wheel with means for reducing temperature gradients in the wheel comprising, in combination, generally parallel front and rear disks, an inner portion, and a rim portion, the aforementioned defining a wheel with an annular cavity between the disks extending from the inner portion to the rim portion, a ring of blades mounted on and extending radially from the rim portion, gas inlet means defined by scoop means projecting from the rim portion adapted to intercept gas flowing between the blades and direct it into the said cavity, and outlet means for the gas from the cavity defined by the wheel at the lower pressure face of the wheel near the rim portion, so that the intercepted gas is directed in a circuit between the disks inwardly from the inlet means to the inner portion and then outwardly to the outlet means due to differential density and centrifugal force so that the gas so circulated acts as a heat transfer medium to transfer heat to the radially inner portion of the wheel and thus reduce radial thermal gradients in the wheel.

2. A stage as recited in claim 1 in which the blades have roots mounted in the wheel and the scoop means is mounted on one or more blade roots.

3. A stage as recited in claim 1 including also thermal insulation on the exterior of the inner portion of the wheel.